United States Patent
Luo et al.

(10) Patent No.: US 9,230,330 B2
(45) Date of Patent: Jan. 5, 2016

(54) THREE DIMENSIONAL SENSING METHOD AND THREE DIMENSIONAL SENSING APPARATUS

(71) Applicant: Industrial Technology Research Institute, Hsinchu (TW)

(72) Inventors: Wen-Shiou Luo, Hsinchu (TW); Chia-Chen Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 190 days.

(21) Appl. No.: 13/861,403

(22) Filed: Apr. 12, 2013

(65) Prior Publication Data

US 2014/0177942 A1     Jun. 26, 2014

(30) Foreign Application Priority Data

Dec. 26, 2012  (TW) .............................. 101150246 A (51) Int. Cl.
- *G06T 7/00* (2006.01)
- *G06T 3/40* (2006.01)
- *H04N 13/00* (2006.01)

(52) U.S. Cl.
CPC .................. *G06T 7/0081* (2013.01); *G06T 3/40* (2013.01); *G06T 7/0075* (2013.01); *G06T 2207/10012* (2013.01); *G06T 2207/10021* (2013.01); *G06T 2207/20132* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 6,490,364 B2 | 12/2002 | Hanna et al. | |
| 6,995,762 B1* | 2/2006 | Pavlidis et al. | ............... 345/419 |
| 7,103,212 B2 | 9/2006 | Hager et al. | |
| 7,433,024 B2 | 10/2008 | Garcia et al. | |
| 7,852,461 B2 | 12/2010 | Yahav | |
| 8,111,908 B2 | 2/2012 | Sim et al. | |

(Continued)

FOREIGN PATENT DOCUMENTS

| | | |
|---|---|---|
| CN | 101795361 | 8/2010 |
| CN | 102005039 | 4/2011 |

(Continued)

OTHER PUBLICATIONS

English Translation of International Search Report.*

(Continued)

*Primary Examiner* — Vu Le
*Assistant Examiner* — Alexander J Lesnick
(74) *Attorney, Agent, or Firm* — Jianq Chyun IP Office (57) ABSTRACT

A three dimensional (3D) sensing method and an apparatus thereof are provided. The 3D sensing method includes the following steps. A resolution scaling process is performed on a first pending image and a second pending image so as to produce a first scaled image and a second scaled image. A full-scene 3D measurement is performed on the first and second scaled images so as to obtain a full-scene depth image. The full-scene depth image is analyzed to set a first region of interest (ROI) and a second ROI. A first ROI image and a second ROI image is obtained according to the first and second ROI. Then, a partial-scene 3D measurement is performed on the first and second ROI images accordingly, such that a partial-scene depth image is produced.

19 Claims, 8 Drawing Sheets

(56) References Cited

U.S. PATENT DOCUMENTS

| | | | |
|---|---|---|---|
| 2004/0105580 A1* | 6/2004 | Hager et al. | 382/154 |
| 2009/0016642 A1 | 1/2009 | Hart | |
| 2009/0067749 A1* | 3/2009 | Schiewe et al. | 382/294 |
| 2010/0225746 A1* | 9/2010 | Shpunt et al. | 348/50 |
| 2010/0290674 A1 | 11/2010 | Kim | |
| 2011/0115886 A1 | 5/2011 | Nguyen et al. | |
| 2012/0075432 A1* | 3/2012 | Bilbrey et al. | 348/48 |
| 2014/0009382 A1* | 1/2014 | Chou | G06F 3/017 345/156 |

FOREIGN PATENT DOCUMENTS

| | | |
|---|---|---|
| TW | I297803 | 6/2008 |
| TW | 201015490 | 4/2010 |
| TW | 201044091 | 12/2010 |
| TW | 201120410 | 6/2011 |
| TW | 201142747 | 12/2011 |
| TW | I362628 | 4/2012 |
| TW | 201230773 | 7/2012 |
| TW | 201241547 | 10/2012 |

OTHER PUBLICATIONS

"Office Action of Taiwan Counterpart Application", issued on Aug. 18, 2014, p. 1-p. 9, in which the listed references were cited.

Sung-Yeol Kim, et al., "Generation of ROI Enhanced Depth Maps Using Stereoscopic Cameras and a Depth Camera", IEEE, Transactions on Broadcasting, vol. 54, No. 4, Dec. 2008, pp. 732-740.

Anwar Hasni Abu Hasan, et al., "Region of Interest in Disparity Mapping for Navigation of Stereo Vision Autonomous Guided Vehicle", IEEE, International Conference on Computer Technology and Development, 2009, pp. 98-102.

Javier García, et al., "Three-dimensional mapping and range measurement by means of projected speckle patterns", Applied Optics, vol. 47, No. 16, Jun. 2008, pp. 3032-3040.

Ruigang Yang, et al., "Multi-Resolution Real-Time Stereo on Commodity Graphics Hardware", IEEE, Computer Society Conference on Computer Vision and Pattern Recognition (CVPR'03), 2003, pp. 1-7.

Andreas Koschan, et al., "Dense depth maps by active color illumination and image pyramids", Advances in Computer Vision, 1997, pp. 137-148.

* cited by examiner

THREE DIMENSIONAL SENSING METHOD AND THREE DIMENSIONAL SENSING APPARATUS

CROSS-REFERENCE TO RELATED APPLICATION

This application claims the priority benefit of Taiwan application serial no. 101150246, filed on Dec. 26, 2012. The entirety of the above-mentioned patent application is hereby incorporated by reference herein and made a part of this specification.

BACKGROUND

1. Technical Field

The disclosure relates to a three dimensional sensing method for dynamically adjusting an image sensing region and a resolution and a device therewith.

2. Description of Related Art

Conventional image sensors are sophisticatedly developed, but with which two-dimensional information can be acquired. Therefore, how to effectively acquire information of a third dimension (that is, depth) with a high speed and a high resolution in real time is a topic in such technology development. A depth image can provide more complete spatial image information, and thus can be designed as an operation interface of 3D games or an interactive browsing device. In addition, the depth image also has a development potential in application for safety image monitoring, robot vision, and medical imaging. At the end of 2010, Microsoft Corporation officially releases a new generation of a smart sensory game device Kinect using human actions as an interactive medium of games, in which a depth sensor is a main core element. It can be expected that more and more technologies and applications thereof related to gestures and human interactive interfaces will be developed in a next year.

With a progress of manufacturing technology, a high-resolution image capture devices such as cameras, video cameras are in widespread use. While an image transferring rate and an image processing speed of those cameras are limited, it is difficult that the high-resolution image capture device performs a real-time high-resolution 3D measurement. In more details, the depth measurement precision is determined by two factors, a measurement range and a resolution of the image capture device. Therefore, the smaller the measurement range is, the higher the precision will be. However, if the measurement range is too small, it is possible to raise the restrictions on the use. On the other hand, the higher the resolution is, the higher the precision will be, but the amount of data turns over-large that it could cause such problems like consuming excessive resources for image processing, reducing the reaction rate significantly, and delaying the time for transmission. Therefore, in the situation of limited computing resources, how to balance the precision and the processing speed for the measurement and to dynamically adjust the image sensing area and the resolution is an issue in the real-time high-resolution 3D measurement.

SUMMARY

Embodiments disclosed herein provide a three dimensional sensing method and device. The method is provided to achieve the high-resolution three dimensional measurements that can dynamically adjust the measurement range with both properties of the measurement precision and the processing speed.

According to an exemplary embodiment, the three dimensional sensing method is introduced herein for performing the depth image calculation on the first pending image and the second pending image, and the resolution of the first pending image and the second pending image is M×N. The three dimensional sensing method includes performing a resolution scaling on the first pending image and the second pending image respectively to generate the first scaled image and the second scaled image, and resolutions of the first scaled image and the second scaled image are m×n, where m<M, n<N, M, N, m, n are positive integers. The three dimensional sensing method includes performing a full-scene three dimensional measurement on the first scaled image and the second scaled image to obtain a full-scene depth image. The three dimensional sensing method further includes setting the first region of interest (ROI) of the image acquiring device which generates the first pending image and setting the second ROI of the image acquiring device which generates the second pending image by analyzing the full-scene depth image. The three dimensional sensing method also includes obtaining the first ROI image based on the first region and obtaining the second ROI image based on the second region and performing a partial-scene three dimensional measurement on the first ROI image and the second ROI image to obtain a partial-scene depth image.

According to another exemplary embodiment, the three dimensional sensing device includes a projecting device, an image acquiring device and an image processing unit. The projecting device serves as a virtual image acquiring device for projecting a projection pattern to an object, and an inherent image of the projection pattern serves as a virtual first pending image. An image acquiring device senses the projection pattern projected on the object for generating a real second pending image. The resolutions of the first pending image and the second pending image are M×N. An image processing unit is coupled to the projecting device and the image acquiring device. The image processing unit performs the resolution scaling on the first pending image and the second pending image to generate the first scaled image and the second scaled image. The resolutions of the first scaled image and the second scaled image are m×n, where m<M, n<N, and M, N, m, n are positive integers. The image processing unit performs a full-scene three dimensional measurement on the first and the second scaled image to obtain a full-scene depth image. The image processing unit analyzes the full-scene depth image to set the first region of interest (ROI) in the projecting device and a second ROI in the image acquiring device, respectively. Hence, the image processing unit performs a partial-scene three dimensional measurement on the first ROI and the second ROI, and thereby a partial-scene depth image is obtained accordingly.

According to another exemplary embodiment, the three dimensional sensing device includes a projecting device, the first image acquiring device and the second image acquiring device. The projecting device projects a projection pattern to an object. The first image acquiring device and the second image acquiring device sense the projection pattern projected on the object respectively to generate the first pending image and the second pending image which resolutions of the first and the second pending image are M×N. The image processing unit is coupled to the projecting device and the first image acquiring device and the second image acquiring device. The image processing unit performs the resolution scaling on the first pending image and the second pending image to generate a first scaled image and a second scaled image. The resolutions of the first scaled image and the second scaled image are m×n, where m<M, n<N, and M, N, m, n are positive integers.

The image processing unit performs a full-scene three dimensional measurement on the first scaled image and the second scaled image to obtain a full-scene depth image. The image processing unit analyzes the full-scene depth image to set a first region of interest (ROI) in the first image acquiring device and set a second ROI in the second image acquiring device. Hence, the image processing unit performs a partial-scene three dimensional measurement on a first ROI image and a second ROI image, and thereby a partial-scene depth image is obtained accordingly.

Accordingly, the present disclosure provides the three dimensional sensing method and apparatus. By using the resolution scaling and setting the region of interest, the present disclosure can provide the digital-zoom three dimensional sensing method and apparatus for dynamically adjusting the measurement range with the high speed and high resolution.

In order to make the aforementioned and other features of the present invention more comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments and, together with the description, serve to explain the principles of the invention.

DESCRIPTION OF DISCLOSED EMBODIMENTS

Some of exemplary embodiments herein provide a three dimensional sensing method and a device therewith. An exemplary embodiment of the disclosure provides a three dimensional sensing method that may dynamically adjust the range of a captured image by using both resolution scaling and a region of interest. The three dimensional sensing method may be capable of performing a low-resolution depth measurement on a global area or a high-resolution depth measurement on a local area, both of which may allow the device therewith maintain operating at a high speed. Meanwhile, the calibration and measurement method of the exemplary embodiment of the method may be provided to achieve the similar function of a three dimensional measurement of a digital-zoom depth camera, by using a coordinate transformation and a dual-image capture device. Embodiments of the disclosure may be implemented in many different forms and should not be construed as being limited to the embodiments set forth herein. Furthermore, these exemplary embodiments are provided so that the disclosure will be thorough and complete, and will fully convey the concept of example embodiments to those of ordinary skilled in the art.

Figure 1:
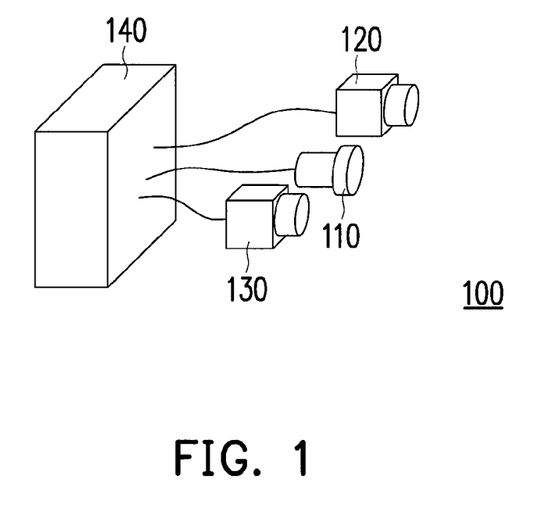
FIG. 1 is a schematic diagram illustrating configuration of a three dimensional sensing device according to an exemplary embodiment of the disclosure.

FIG. 1 is a schematic diagram illustrating configuration of a three dimensional sensing device according to an exemplary embodiment of the disclosure. Referring to FIG. 1, a three dimensional sensing device 100 according to the exemplary embodiment includes a projecting device 110, at least two image acquiring devices 120 and 130, and an image processing unit 140. The projecting device 110 is, for example, an optical projecting device or a digital projecting device. The projecting device 110 projects a projection pattern of scattered light spots distributed at random to an object (not shown). The pattern of the scattered light spots distributed at random may be pre-designed or generated automatically at random. The image acquiring devices 120 and 130 are provided to acquire images that a projection pattern is projected on the object to obtain a first pending image and a second pending image, respectively. The image acquiring devices 120 and 130 may be, for example, an ordinary video camera, a single lens reflex, a digital camera or a camera which may be used to acquire image information.

The image processing unit 140 may be a central processing unit (CPU), a programmable logic controller (PLC), a digital signal processor (DSP), an application-specific integrated circuit (ASIC), or the like. The image processing unit 140 may be coupled to the projecting device 110 and coupled to the image acquiring devices 120 and 130 to receive and process the image acquired by the image acquiring devices 120 and 130.

Figure 2:
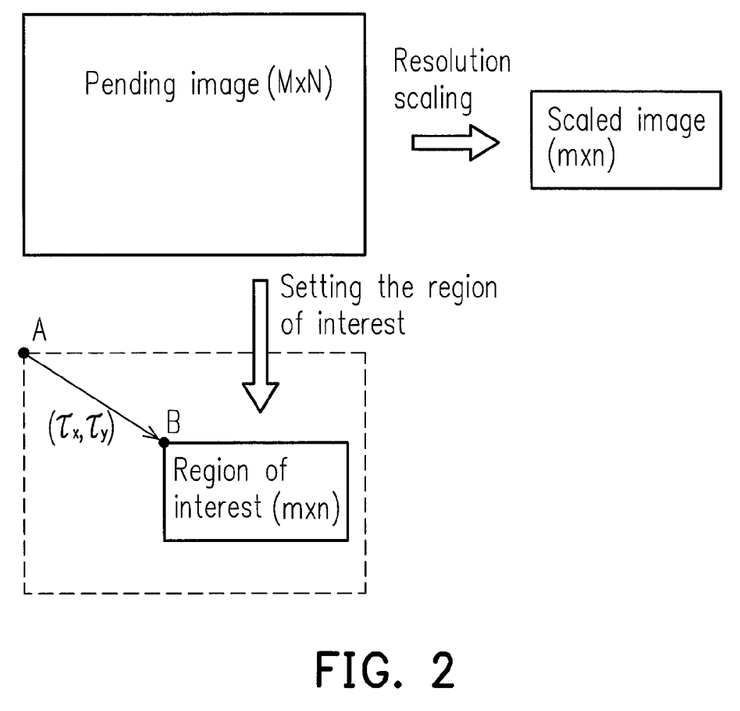
FIG. 2 is a schematic diagram illustrating resolution scaling and a region of interest according to an exemplary embodiment of the disclosure.

FIG. 2 is a diagram illustrating resolution scaling and a region of interest according to an exemplary embodiment of the disclosure. Referring to FIG. 1 and FIG. 2, it is assumed that a maximal image resolution of a pending image acquired by the image acquiring device 120 or 130 is M×N. Hence, the resolution may be scaled to m×n by resolution scaling, where m<M, n<N, and M, N, m, n are positive integers. Although the resolution is reduced by the resolution scaling, a depth measurement may be processed at the global area because a visual range remains invariant. On the other hand, in the process of setting the region of interest, although the resolution remains invariant, the dimension of the output image may be scaled from M×N to m×n. The high-resolution depth measurement may be processed because the resolution remained invariant even though the visual range is reduced in the process of setting the region of interest.

When the three dimensional device 100 performs the depth measurement, for example, at m×n resolution, the image data transmitted to the image processing unit 140 by the image acquiring devices 120 and 130 can be maintained at the m×n resolution. Accordingly, because the size of the image data can be kept within a designated range when the image data is transmitted or processed by the image processing unit 140, a high-speed operation can be processed when the depth measurement is performed by the three dimensional sensing device 100.

As shown in FIG. 1, the three dimensional sensing device 100 performs the depth measurement by using two image acquiring devices. In another exemplary embodiment, however, one of the dual-image acquiring devices can be a virtual camera, that is, a projecting device conforming to a pin-hole model or a pinhole camera model.

Figure 3:
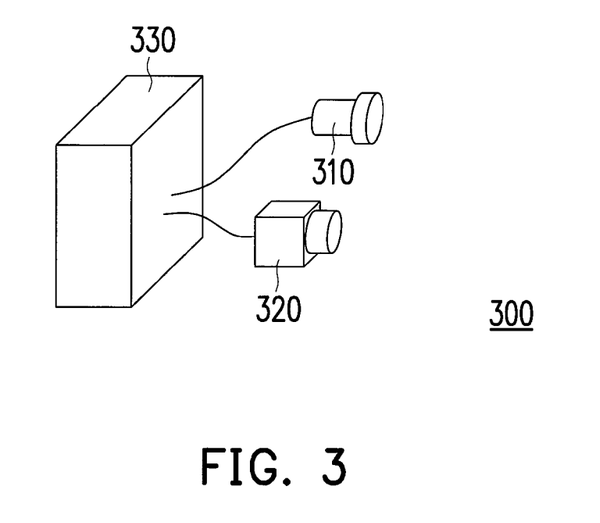
FIG. 3 is a schematic diagram illustrating a three dimensional sensing device according to another example embodiment of the disclosure.

FIG. 3 is a schematic diagram illustrating a three dimensional sensing device according to another example embodiment of the disclosure. Referring to FIG. 3, a three dimensional sensing device 300 according to the exemplary embodiment includes a projecting device 310, an image acquiring device 320, and an image processing unit 330. In the exemplary embodiment, the projecting device 310 is served as a virtual image acquiring device, which is also called a virtual camera, to produce an inherent image which serves as a first pending image. The first pending image and a second pending image acquired by the image acquiring device 320 are transmitted to the image processing unit 330 together. The image processing unit 330 analyzes these images to obtain a full-scene depth image or a partial-scene depth image.

During measuring, the projecting device 310 may be used for two purposes, one of which is to serve as a light source, so that a physical real camera (for example, the image acquiring device 320) can capture the image; and the other one of which is to create variations in brightness or colors, so that the image acquired by the real camera has abundant features or variations, which are adaptive for subsequent analysis of the images.

Figure 4:
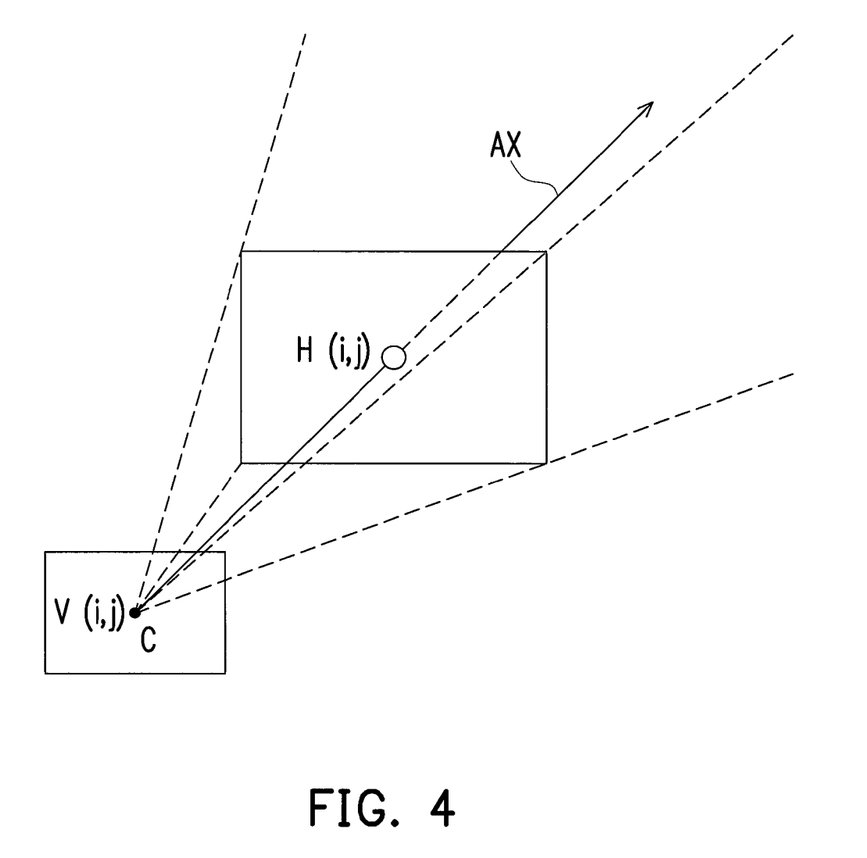
FIG. 4 is a schematic diagram illustrating a relationship between an inherent image and a virtual image when a projecting device serves as a virtual image acquiring device.

In details, FIG. 4 is a schematic diagram illustrating a relationship between an inherent image and a virtual image when a projecting device serves as a virtual image acquiring device. As shown in FIG. 4, when the projecting device is described by using the pin-hole model, the projecting device may be considered as a virtual camera. An optical axis AX and a projecting center C of the virtual camera are substantially identical to those of the projecting device, so that the location and the size of a virtual image V(i,j) are substantially identical to or proportional to those of the inherent image H(i,j) of the projecting device. That is, the inherent image is an image projected by the projecting device, and the image acquired by the virtual camera is a digital image which is called a digitalized inherent image (a digitalized image of the inherent image). In the exemplary embodiment, the resolution of the digitalized inherent image can be also configured to be the maximal resolution M×N, and thus the digitalized inherent image can serve as the first pending image. Therefore, the resolution scaling and the region of interest may be also performed on the digitalized inherent image captured by the virtual camera.

Figure 5:
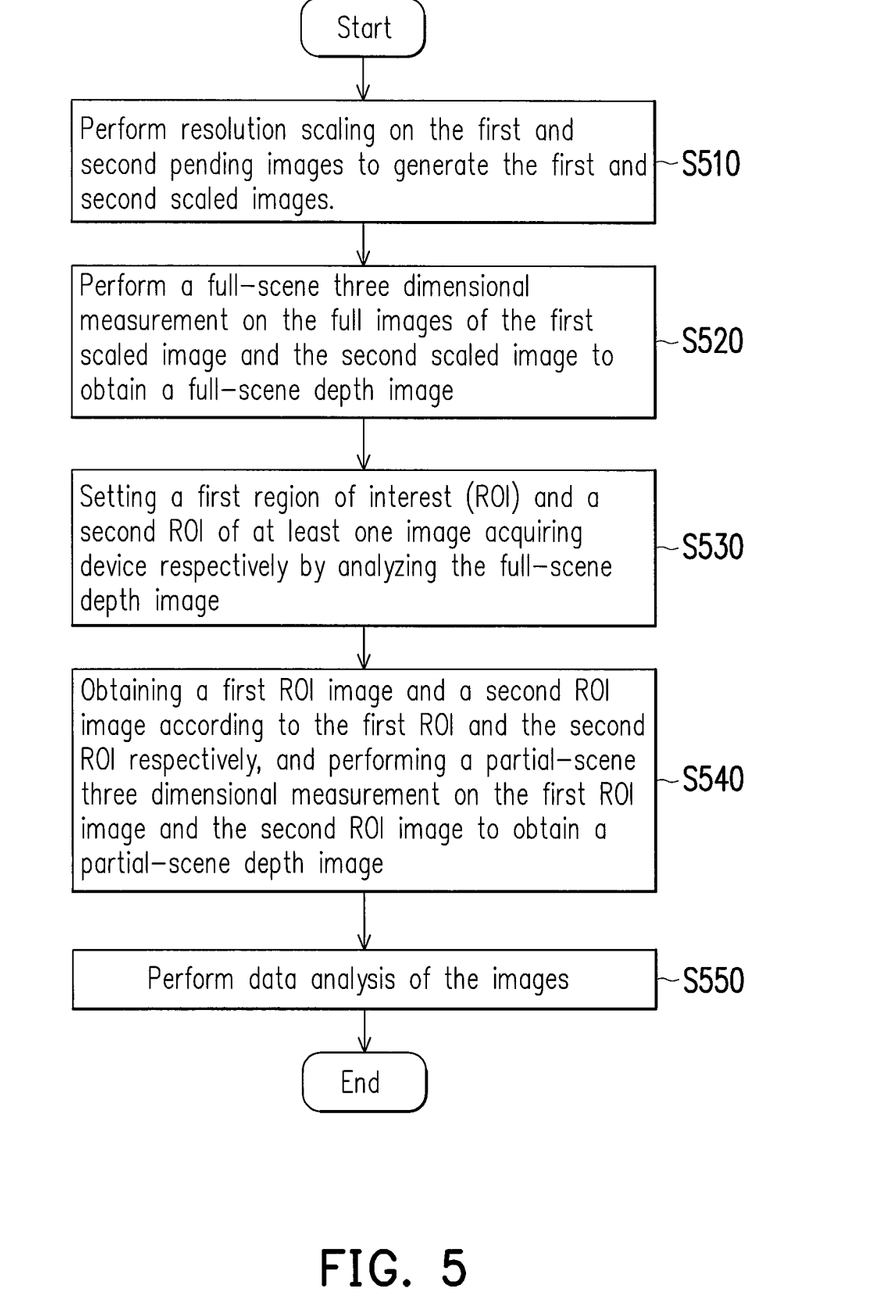
FIG. 5 is a flow chart illustrating the three dimensional sensing method according to one exemplary embodiment of the disclosure.

FIG. 5 is a flow chart illustrating the three dimensional sensing method according to one exemplary embodiment of the disclosure. The method of the embodiment may be applied to the three dimensional sensing device 100 as shown in FIG. 1 or the three dimensional sensing device 300 as shown in FIG. 3. For explanation in details, the following steps are elaborated to describe the method of the exemplary embodiment of the disclosure with the reference to the aforesaid three dimensional sensing device 300, for example.

In step S510, the image processing unit 330 scales the first pending image and the second pending image in resolution to produce the first scaled image and the second scaled image, respectively. The first pending image and the second pending image are captured, respectively, by the projecting device 310 and the image acquiring device 320. The resolutions of the first pending image and the second pending image are M×N, and the resolutions of the first scaled image and the second scaled image are m×n, where m<M and n<N. In other words, the resolutions of the first scaled image and the second scaled image are lower than those of the first pending image and the second pending image.

In step S520, the image processing unit 330 performs a full-scene three dimensional measurement on the first scaled image and the second scaled image to obtain a full-scene depth image. That is, the resolution is reduced by performing the resolution scaling at the beginning of the measurement, and then a depth map can be obtained accordingly. Although the accuracy of measurements may be reduced, the measurement speed is increased and the measurement range remains fixed.

Hence, in step S530, the image processing unit 330 sets a first region of interest (ROI) and a second ROI of the image acquiring device, respectively, by analyzing the full-scene depth image, which the first pending image and the second pending image are acquired by the image acquiring device. In details, the image processing unit 330 may analyze the full-scene depth image to set the first ROI in the projecting device 310 and the second ROI in the image acquiring device 320.

Figure 6:
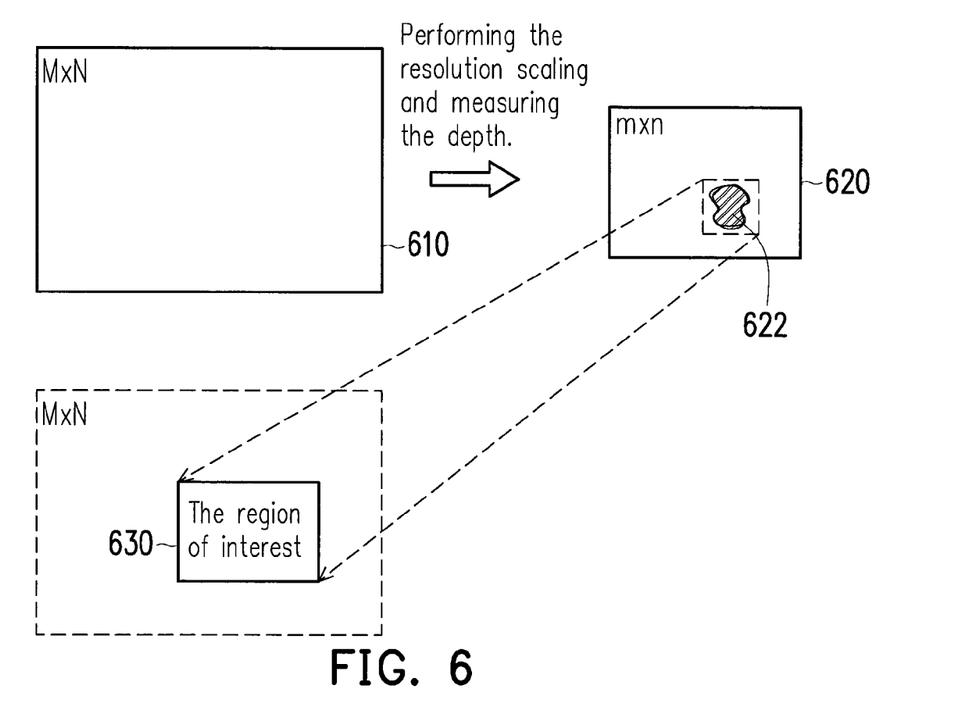
FIG. 6 is a schematic diagram illustrating a method to set the region of interest according to one exemplary embodiment of the disclosure.

FIG. 6 is a schematic diagram illustrating a method to set the region of interest according to one exemplary embodiment of the disclosure. Referring to FIG. 6, for example, the image 610 is the first pending image with the M×N resolution. The full-scene depth image 620 can be obtained after the resolution scaling and the full-scene three dimensional measurement are performed on the image 610. The region with a specific shape or with a designated feature in the full-scene depth image 620 may be analyzed and detected by the image processing unit 330 to serve as the interested area 622. And then, the resolution at the interested area 622 may be restored to M×N for setting the region of interest 630. The dimension of the region of interest 630 is m×n, and the region of interest 630 covers the image of the interested area. The method relates to set a second region of interest based on the first region of interest will be detailed described below.

In step S540, a first ROI image may be obtained by the projecting device 310 based on the position of the first ROI, and a second ROI image may be obtained by the image acquiring device 320 based on the position of the second ROI. A partial-scene depth image is obtained by performing a partial-scene three dimensional measurement on the first ROI image and the second ROI image by the image process unit 330. In the step, the measurement result with high accuracy is obtained because only the image block in the ROI is measured.

In step S550, the subsequent data analysis may be performed based on the actual required situation. The flow may go back to the step S510 for the next required measurement and analysis.

The method of the embodiment combines resolution scaling with the ROI setting so that the depth measurement can be performed at a much higher speed, and the method can also find the key area in the global area fast and perform a high-accuracy depth measurement. The following description refers to an example of the embodiment which the three dimensional sensing devices 100 and 300 may achieve a function of digital zoom.

Figure 7:
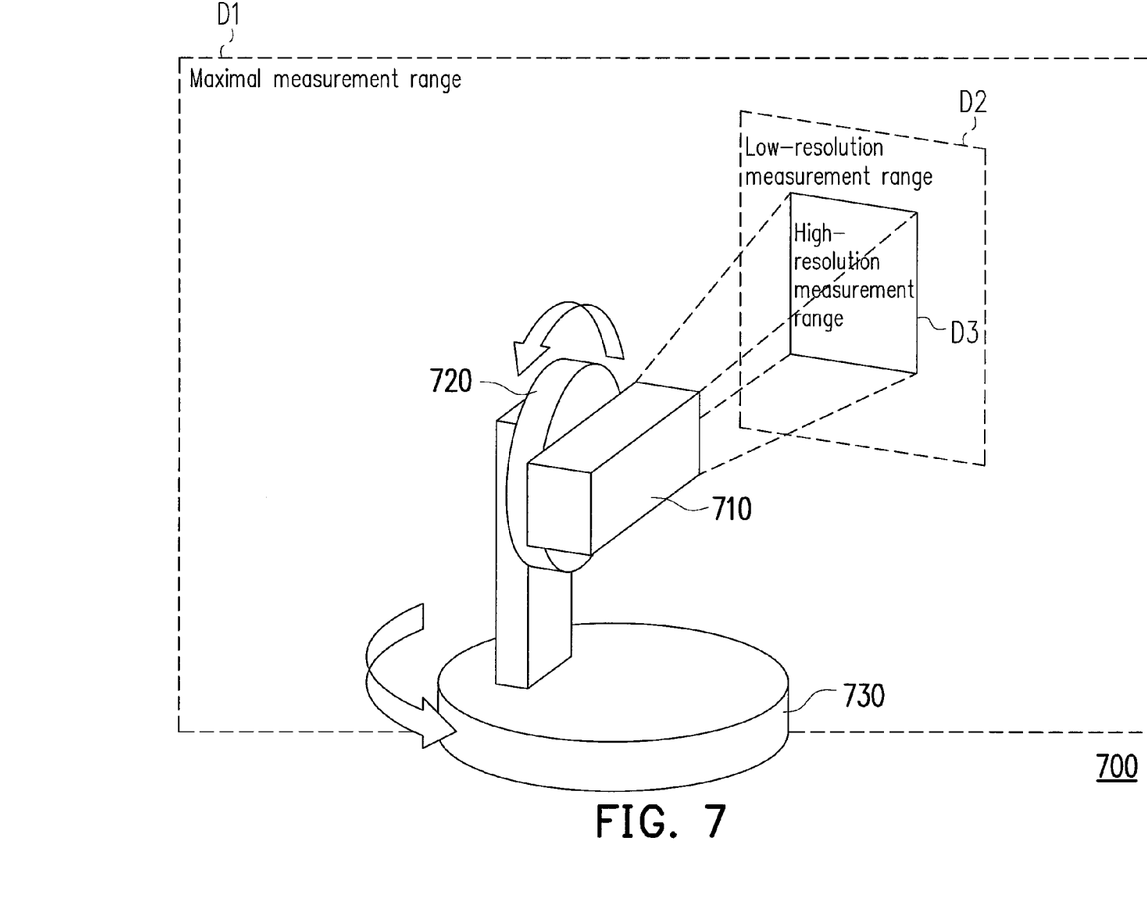
FIG. 7 is a schematic diagram illustrating a mechanical three dimension sensing device.

FIG. 7 is a schematic diagram illustrating a mechanical three dimensional sensing device. Referring to FIG. 7, the mechanical three dimensional sensing device 700 includes a zoomable depth camera 710 and two rotation axes 720 and 730. The measurement range of the zoomable depth camera 710 may be modified by changing a focal distance accompanying with the two rotation axes in different directions. For example, a dotted line D1 shows the largest measurement range of the zoomable depth camera 710; a dotted line D2 shows a measurement range with a lower resolution by the zoomable depth camera 710 at a large area with a small focal length; and a solid line D3 shows a measurement range with a higher resolution by the zoomable depth camera 710 at a small area with a large focal length.

The mechanical three dimensional sensing device shown in FIG. 7 costs much and is too unwieldy to move. Therefore, the mechanical three dimensional sensing device can be replaced with an electronic three dimensional measuring system as provided in one embodiment of the disclosure. By combining the resolution scaling with the ROI setting, the electronic three dimensional measuring system can perform the zoomable three dimensional measuring. By using the ROI setting, it can also simulate the rotational scanning process of the mechanical three dimensional sensing device.

Figure 8A:
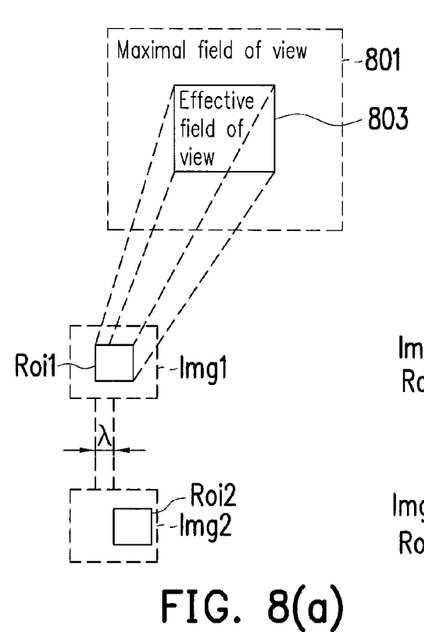
FIG. 8a and FIG. 8b are the schematic diagrams illustrating a digital zoom image acquiring device according to one of exemplary embodiments of the disclosure.
Figure 8B:
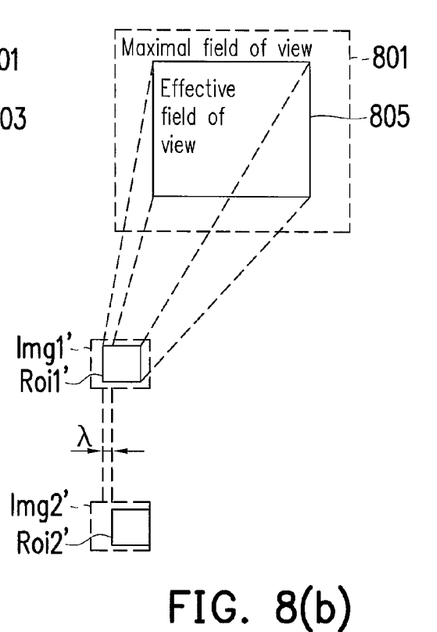

FIG. 8a and FIG. 8b are the schematic diagrams illustrating a digital-zoom image acquiring device according to one of exemplary embodiments of the disclosure. First, the maximal visual range 801 (maximal field of view) of the image acquiring device may be captured as images with different resolutions by the method of the resolution scaling. The resolution of the maximal visual range 801 is, for example, M×N. For instance, the resolution of the first image Img1 shown in FIG. 8a is a×b, and the resolution of the first image Img1' shown in FIG. 8b is c×d, where a>c, b>d, and a, b, c, d are positive integers. Then, the region of interest Roi1, Roi1' may be selected from the first image Img1 in FIG. 8a and the first image in FIG. 8b, respectively, with the same dimension. The dimensions of the region of interest Roi1, Roi1' are, for example, m×n. As shown in FIG. 8a and FIG. 8b, effective visual ranges 803 and 805 of the regions of interest Roi1 and Roi1', respectively, may be varied from the scaling factors of the resolution scaling.

For example, the first image Img1 in FIG. 8a may be captured by the image acquiring device 120 in FIG. 1 (or the projecting device 310 in FIG. 3), and the second image Img2 in FIG. 8a can be captured by the image acquiring device 130 in FIG. 1 (or the image acquiring device 320 in FIG. 3). For example, when the three dimensional sensing device 100 in FIG. 1 performs the digital-zoom depth measurement, the dimension of the region of interest of the image acquiring devices 120 and 130 may be remained invariant. Also, the position of the region of interest in the image acquiring device 120 may be kept at the center position, and the region of interest of the image acquiring device 130 may be kept with a distance apart from the center position, that is a disparity, in which the most correspondent points may be obtained from the first captured image Img1 and the second captured image Img2. The disparity λ, is related to the depth of the object and can be estimated by calibrating parameters of the image acquiring devices 120 and 130 accompanying with the full-scene measurement or the result previously measured.

Accordingly, implementation of the digital-zoom depth measurement with a high scaling ratio can be realized in FIG. 8a, and implementation of the digital-zoom depth measurement with a low scaling ratio can be realized in FIG. 8b. The function of the digital-zoom depth measurement can be achieved by the three dimensional measurement performed on the regions of interest by two image acquiring devices with varying scaling factors for different resolutions. In the exemplary embodiment of the disclosure, the effect that changes the position of the region of interest in the first image acquiring device and the corresponding position of the region of interest in the second image acquiring device can be equivalent to the effect that changes the measurement positions by using two rotation axes 720 and 730 in FIG. 7.

The following describes in details the relationship of the coordinate transformation between the first scaled image and the second scaled image (resolution is m×n) and the first pending image and the second pending image (resolution is M×N) after the resolution scaling and the ROI setting. It is assumed that (x,y) is a coordinate of a point in the first pending image or in the second pending image. After performing the resolution scaling, the relationship between the point (x,y) and a correspondent point (x',y') in the first scaled image or in the second scaled image is described as below:

$$x = \alpha x'$$
$$y = \beta y' \quad (1)$$

where α is a horizontal scaling factor of the resolution scaling, and β is a vertical scaling factor of the resolution scaling, which α=M/m and β=N/n. When α=β, it is represented that the horizontal scaling factor of the resolution scaling is equal to the vertical scaling factor of the resolution scaling. When α≠β, it is represented that the horizontal scaling factor of the resolution scaling is not equal to the vertical scaling factor of the resolution scaling.

On the other hand, it is assumed that (x,y) is a point at the first pending image or the second pending image. After the region of interest is set, (x",y") is the correspondent point at the first ROI image or the second ROI image, and the relationship between the two points is described as following:

$$x = x'' + \tau_x$$
$$y = y'' + \tau_y \quad (2)$$

where $(\tau_x, \tau_y)$ is the translation vector form the origin point A of the pending image to the origin point B of the ROI image, as shown in FIG. 2.

Figure 9:
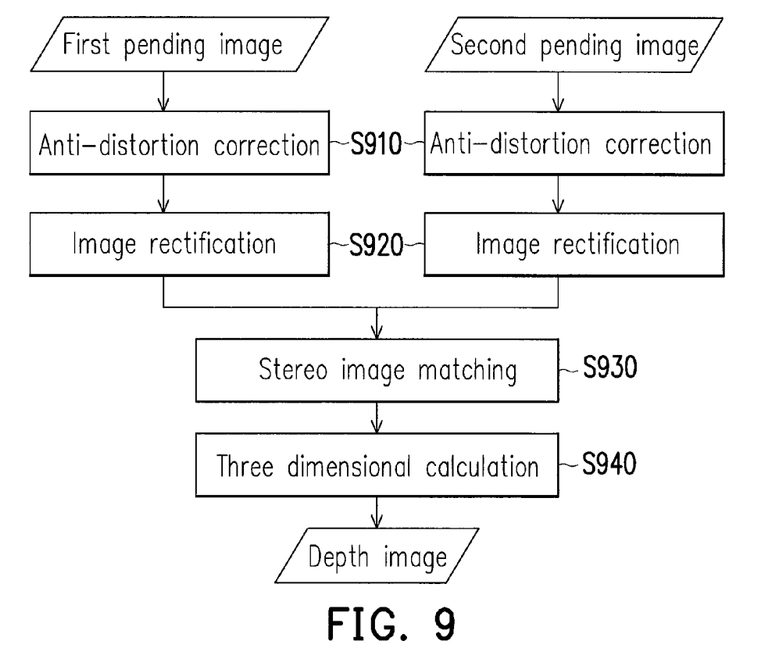
FIG. 9 is a flow chart illustrating a three dimensional sensing method of dual cameras.

FIG. 9 is a flow chart illustrating a three dimensional sensing method of dual cameras. Resolutions and visual ranges of the dual cameras are fixed in this illustration of the exemplary embodiment. First, the distortion effects of cameras are eliminated by performing anti-distortion correction. Therefore, as in step S910, the distortion of a first pending image and a second pending image captured by the dual cameras may be eliminated, and become ideal images conforming to the pin-hole model. In the exemplary embodiment, it is assumed that (x,y) is a coordinate of a point in the original image and (x',y') is a coordinate of a point, which is a new point generated by performing anti-distortion correction on (x,y) at the original image. The relationship between the two points is described as following:

$$x' = \Phi_x(x,y)$$
$$y' = \Phi_y(x,y) \quad (3)$$

where $\Phi_x$ and $\Phi_y$ are the anti-distortion correction functions. The anti-distortion correction function may employ any anti-distortion correction formula suitable to the cameras to perform the anti-distortion correction.

After the anti-distortion correction is performed, an image rectification process may be performed respectively on the first transformed image and the second transformed image, and then the correspondent points at the two images may be located at the same horizontal line as in step S920. For example, the image rectification may be performed by using two matrices $H_1$ and $H_2$ with the matrix dimension 3×3, where $H_1$ is the rectification matrix for the first camera and $H_2$ is the rectification matrix for the second camera. Both the anti-distortion correction and the image rectification are simply used for the coordinate transformation, and therefore these two functions may be combined into a composite transformation function. In the exemplary embodiment, it is assumed that $(x_1,y_1)$ and $(x_2,y_2)$ are points at the first pending image and the second pending image respectively. After the anti-distortion correction and the image rectification, the new points at the first pending image and the second pending image are $(x'_1,y'_1)$ and $(x'_2,y'_2)$ respectively. The relationship between two former points and two latter points is shown as following:

$$x_1'=\Psi_x^1(x_1,y_1), y_1'=\Psi_y^1(x_1,y_1)$$

$$x_2'=\Psi_x^2(x_2,y_2), y_2'=\Psi_y^2(x_2,y_2) \quad (4)$$

where $\Psi^1$ and $\Psi^2$ is the composite transform function for the first pending image and the second pending image respectively. After the image rectification is performed on the two images, correspondent points at the two images can be found by performing a stereo matching process on the two images in step S930. After the correspondent points are found, positions of three dimensional points can be calculated by using three dimensional parameters of two cameras in step S940. Three dimensional parameters of the two cameras can be represented as, for example, two projection matrices $P_1$ and $P_2$ with matrix dimension 3×4, where $P_1$ is a projection matrix of the first camera and $P_2$ is a projection matrix of the second camera. Three dimensional coordinate of the point $(x_1,y_1)$ in the first image can be calculated by inputting the point $(x_1,y_1)$ in the first image and its correspondent point $(x_2,y_2)$ at the second image into the projection matrices $P_1$ and $P_2$ respectively. As long as all of the correspondent points in the second image are found by performing the stereo matching on all of the pixels of the first image, and then the depths of every pixels of the first image can be calculated therefrom and thus a depth image can be generated.

Figure 10:
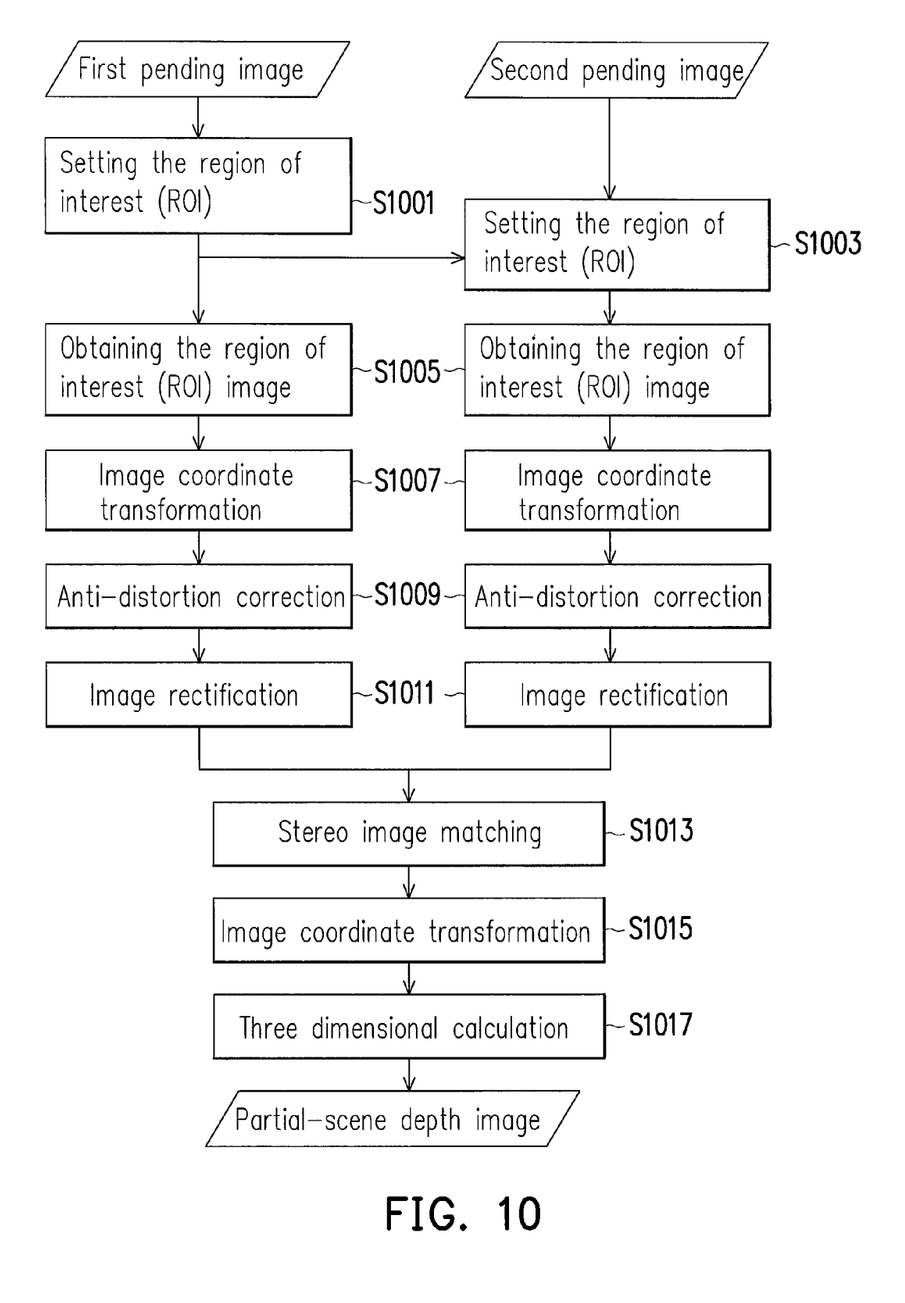
FIG. 10 is the flowchart illustrating a three dimensional sensing method according to another exemplary embodiment of the disclosure.

FIG. 10 is a flowchart illustrating a three dimensional sensing method according to another exemplary embodiment of the disclosure. Different from FIG. 9, both the resolution and the visual range of the dual cameras can be varied by using the three dimensional sensing method in FIG. 10. The dual cameras may be, for example, the image acquiring devices 120 and 130 shown in FIG. 1; or the projecting device 310, which serves as a virtual camera, and the image acquiring device 320 shown in FIG. 3. However, the method to determine the dual cameras is designed as required, and the disclosure is not limited hereto.

The dual cameras are calibrated before performing the depth measurement, so as to obtain three dimensional parameters for the cameras in the three dimensional measurement. In the calibration process, the resolution of these two cameras may be set to the maximal resolution M×N respectively, and the anti-distortion correction, the image rectification, and the three dimensional parameters for the cameras may be obtained by a conventional calibration method suitable for the cameras. When the calibration process is performed, the cameras are set at the maximal resolution M×N so that they can obtain the largest calibration precision. Furthermore, the coordinates of the image with the resolution m×n obtained after performing resolution scaling and setting the region of interest can be restored to the coordinates of the original M×N images. Accordingly, the cameras only perform the calibration process once with the maximal resolution M×N, and then the image coordinate transformation and three dimensional coordinate calculations can be performed according to the calibration parameters.

Referring to FIG. 10, in the exemplary embodiment, because the three dimensional sensing method is performed by setting the region of interest, the region of interest of the first camera may be determined based on the first pending image in step S1001. As shown in FIG. 6, the interested area may be selected by analyzing the depth image by performing a full-scene three dimensional measurement with a low resolution at first, and then the region of interest of the first camera is set according to the interested area.

Figure 11:
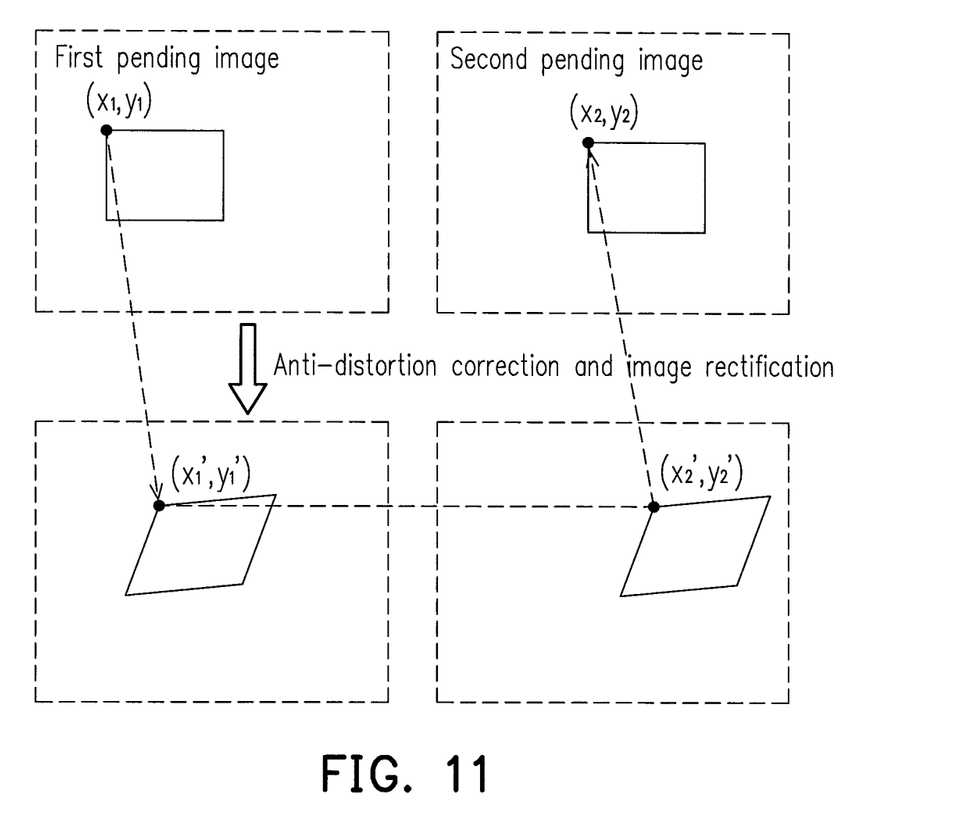
FIG. 11 is a schematic diagram illustrating setting the region of interest according to another exemplary embodiment of the disclosure.
Figure 12:
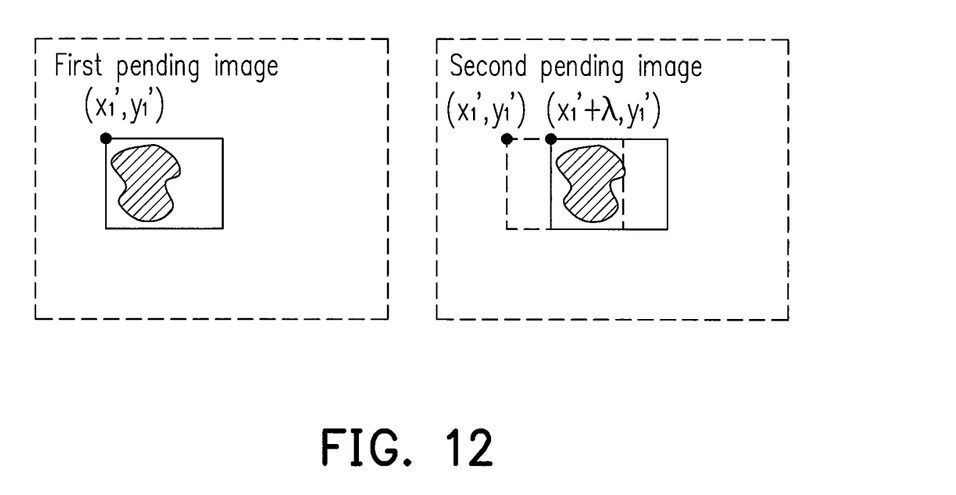
FIG. 12 is a schematic diagram illustrating setting the region of interest based on the disparity according to the exemplary embodiment of the disclosure.

FIG. 11 is a schematic diagram illustrating the region of interest setting according to another exemplary embodiment of the disclosure. In the exemplary embodiment, it is assumed that a coordinate $(x_1,y_1)$ is the origin of the region of interest in the first pending image and the dimension is m×n. After the composite transformation function $\Psi^1$ of the anti-distortion correction and the image rectification in the first camera is performed, the origin $(x_1,y_1)$ is transformed to a new coordinate $(x'_1,y'_1)$. After the composite transformation function $\Psi^2$ of the anti-distortion correction and the image rectification in the second camera is performed, a correspondent point to the new coordinate $(x'_1,y'_1)$ is $(x'_2,y'_2)$. The two points $(x'_1,y'_1)$ and $(x'_2,y'_2)$ of the two cameras are located at the same horizontal line because both of the cameras have performed the image rectification. The relationship between the two points $(x'_1,y'_1)$ and $(x'_2,y'_2)$ is shown as following:

$$x_2'=x_1'+\lambda$$

$$y_2'=y_1' \quad (5)$$

where $\lambda$ is the disparity which is related to the depth of $(x_1,y_1)$ and is an unknown value. An approximate value for the disparity can be estimated according to the measurement result from performing a full-scene three dimensional measurement with low resolution. FIG. 12 is a schematic diagram illustrating the region of interest setting based on the disparity according to the exemplary embodiment of the disclosure. As shown in FIG. 12, the position of the object in the first image is a distance apart from the position of the object in the second image, that is a disparity, and the disparity may be varied from the depth of the object. If the disparity $\lambda$ is estimated improperly, the object may not be covered entirely by the region of interest in the second camera so that it may result in an incomplete measurement. It is noted that an estimation of the disparity $\lambda$ may not require high accuracy, but require that the object is covered entirely by the region of interest in the second camera. Referring to FIG. 11, after the appropriate coordinate $(x'_2,y'_2)$ is obtained, the coordinate $(x_2,y_2)$ at the second pending image can be obtained through the inverse composite transformation $(\Psi^2)^{-1}$ of the second camera. The following formulas show the relationship between the two points:

$$x_2=(\Psi^2)_x^{-1}(x_2',y_2')$$

$$y_2=(\Psi^2)_y^{-1}(x_2',y_2') \quad (6)$$

Then, the coordinate $(x_2,y_2)$ may be set as the origin of the region of interest of the second camera, where the dimension of the region of interest image is also m×n in step S1003.

Referring back to FIG. 10, in step S1005, after the region of interest of the first camera and the region of interest of the second camera are set, it simply requires acquiring the ROI images with the dimension m×n while performing the measurement. In step S1007, after the coordinates of these m×n ROI images are transformed back to the original M×N images by the formula (2), the calibration parameters of the first pending image and the second pending image with resolution M×N may be used to perform the composite image transformation of the anti-distortion correction and the image rectification to generate a new ROI image with the dimension m×n in step S1009 and S1011. The correspondent points may be found by using the stereo matching for the two newly generated ROI images with the dimension m×n in step S1013. And then, in step S1015, the correspondent points in the two ROI images are processed again by the formula (2) to transform their coordinates back to the M×N image space. Hence, the calibration parameters of the pending image with the resolution M×N can be used to calculate the three dimensional coordinates in step S1017, and the partial-scene depth image with dimension m×n (partial-scene depth image) may be generated finally. The descriptions of step S1009, S1011, S1013 and S1017 according to the exemplary embodiment are similar to those of step S910, S920, S930 and S940, and thus the corresponding descriptions are omitted.

For simplicity, each image dimension set by the resolution scaling and the region of interest is m×n. Actually, the dimension set by the resolution scaling may be different from the dimension set by the region of interest. Also, the values m and n may not be fixed while the measurement is performed, and any appropriate value can be used according to the actual requirement.

Furthermore, the three dimensional sensing method described in FIG. 10 can be also performed in the exemplary embodiment that the resolution scaling and the ROI setting are performed at the same time. For example, the resolution scaling is performed on the image having resolution M×N with the scaling factor α, and the resolution of the new image is M'×N'. And then, the region of interest is set. The value $(\tau_x, \tau_y)$ may be, for example, the translation vector from the origin of the image with resolution M'×N' to the origin of the region of interest image with a dimension m×n. It is assumed that (x,y) is a point of the image with the resolution M×N, and (x',y') is a point of the image with the dimension m×n corresponding to the point (x,y) after the resolution scaling and the region of interest are performed. The relation between the two coordinates is described as following:

$$x = \alpha(x' + \tau_x)$$

$$y = \alpha(y' + \tau_y) \quad (7)$$

By simply using the formula (7) to perform the coordinate transformation, the method described in FIG. 10 can also perform the three dimension sensing procedure.

As described above, the three dimensional sensing method and the three dimensional sensing device therewith are disclosed. By using the resolution scaling and setting the region of interest, the method can achieve a goal of dynamically adjusting the range of image capturing and the image resolution in the depth image sensing process. Therefore, the disclosure is capable of doing depth measurement in a large full-scene area and performing high-resolution depth measurement in a smaller selected area both at a high speed. Meanwhile, the calibration and measurement method in the exemplary embodiment can achieve the similar function of the three dimensional measurement of the digital-zoom depth camera by incorporating the coordinate transformation with the standard stereo-camera triangulation.

Although the present exemplary embodiment has been described with reference to the above exemplary embodiments, it will be apparent to one of the ordinary skill in the art that modifications to the described exemplary embodiment may be made without departing from the spirit of the invention. Accordingly, the scope of the invention will be defined by the attached claims not by the above detailed descriptions.

What is claimed is:

1. A three dimensional sensing method, for performing a depth image operation upon a virtual first pending image and a real second pending image, and a resolution of the first pending image and a resolution of the second image are respectively M×N, the method comprising:
    projecting a projection pattern to an object, wherein the projecting device serves as a virtual image acquiring device, and an inherent image of the projection pattern serves as a virtual first pending image;
    sensing the projection pattern projected on the object to generate a real second pending image;
    performing a resolution scaling on the first pending image and the second pending image to respectively generate a first scaled image and a second scaled image, and a resolution of the first scaled image and a resolution of the second scaled image are respectively m×n, where m<M, n<N, and M, N, m, n are positive integers
    performing a full-scene three dimensional measurement on the first scaled image and the second scaled image to obtain a full-scene depth image;
    setting a first region of interest (ROI) and a second ROI of at least one image acquiring device respectively by analyzing the full-scene depth image, wherein the at least one image acquiring device generates the first and the second pending images; and
    restoring a resolution of the first ROI and the second ROI of the full-scene depth image according to a scaling factor of the resolution scaling, so as to obtain a first ROI image and a second ROI image respectively, and performing a partial-scene three dimensional measurement on the first ROI image and the second ROI image to obtain a partial-scene depth image.

2. The three dimensional sensing method according to claim 1, wherein the step of setting the first ROI and the second ROI of the at least one image acquiring device respectively by analyzing the full-scene depth image comprises:
    analyzing and detecting a region with a specific shape or a designated feature in the first scaled image, and assigning the region as an interested area; and
    setting the first ROI and the second ROI corresponding to the interested area, respectively, wherein both of the first ROI and the second ROI cover the interested area.

3. The three dimensional sensing method according to claim 2, wherein the step of setting the first ROI and the second ROI corresponding to the interested area further comprises:
    setting the second ROI according to the first ROI and a disparity.

4. The three dimensional sensing method according to claim 1, before performing a partial-scene three dimensional measurement on the first ROI image and the second ROI image, the three dimensional sensing method further comprising:
    performing a coordinate transformation on the first ROI image and the second ROI image, respectively, to obtain a first transformed ROI image and a second transformed ROI image; and
    performing an anti-distortion correction and an image rectification on the first transformed ROI image and the second transformed ROI image respectively to generate a first corrected image and a second corrected image, thereby the partial-scene three dimensional measurement is performed on the first corrected image and the second corrected image.

5. The three dimensional sensing method according to claim 4, wherein the coordinate transformation is performed by scaling a coordinate of a point according to a scaling factor of the resolution scaling.

6. The three dimensional sensing method according to claim 5, wherein the coordinate of the point of the first ROI image or of the second ROI image is (x',y'), and a formula for the coordinate transformation comprises:

$x=\alpha x'$, $\alpha=M/m$; and $y=\beta y'$, $\beta=N/n$;

wherein (x,y) is a coordinate of a point in the first pending image or in the second pending image, and $\alpha$ is a horizontal scaling factor of the resolution scaling, $\beta$ is a vertical scaling factor of the resolution scaling.

7. The three dimensional sensing method according to claim 6, wherein $\alpha$ is equal to $\beta$ when the horizontal scaling factor of the resolution scaling is equal to the vertical scaling factor of the resolution scaling, and $\alpha$ is not equal to $\beta$ when the horizontal scaling factor of the resolution scaling is not equal to the vertical scaling factor of the resolution scaling.

8. The three dimensional sensing method according to claim 4, wherein the coordinate of the point of the first ROI image or of the second ROI image is (x'',y''), and a formula for the coordinate transformation comprises:

$x=x''+\tau_x$; and $y=y''+\tau_y$;

wherein (x,y) is a coordinate of a point corresponding to the first pending image or the second pending image, and $(\tau_x, \tau_y)$ is the translation vector between an origin of the first ROI image or of the second ROI image and an origin of the first pending image or of the second pending image, respectively.

9. A three dimensional sensing device, comprising:
a projecting device, for projecting a projection pattern to an object, wherein the projecting device serves as a virtual image acquiring device, and an inherent image of the projection pattern serves as a virtual first pending image which resolution is M×N;
an image acquiring device, for sensing the projection pattern projected on the object to generate a real second pending image which resolution is M×N;
an image processing unit, coupled to the projecting device and the image acquiring device, for generating a first scaled image and a second scaled image which resolutions are m×n by performing a resolution scaling on the first pending image and the second pending image, where m<M, n<N, and M, N, in, n are positive integers,
wherein the image processing unit performs a full-scene three dimensional measurement on the first scaled image and the second scaled image to obtain a full-scene depth image and analyzes the full-scene depth image to set a first region of interest (ROI) in the projecting device and a second ROI in the image acquiring device, respectively, and the image processing unit restores a resolution of the first ROI and the second ROI of the full-scene depth image according to a scaling factor of the resolution scaling, so as to obtain a first ROI image and a second ROI image and performs a partial-scene three dimensional measurement on the first ROI image and the second ROI image, thereby a partial-scene depth image is obtained accordingly.

10. The three dimensional sensing device according to claim 9, wherein
the image processing unit sets the first ROI in the projecting device and the second ROI in the image acquiring device, respectively, according to an interested area in the first scaled image, wherein the interested area is a region determined by the image processing unit which detects a region with a specific shape or a designated feature in the first scaled image.

11. Three dimensional sensing device according to claim 10, wherein
the image processing unit sets the second ROI according to the first ROI and a disparity.

12. The three dimensional sensing device according to claim 9, wherein the projecting device captures a first ROI image according to the first ROI, and the image acquiring device captures a second ROI image according to the second ROI,
the image processing unit further generates a first corrected image and a second corrected image respectively by performing an anti-distortion correction and an image rectification to a first transformed ROI image and a second transformed ROI image, wherein the first transformed ROI image and the second transformed ROI image are obtained by the image processing unit which performs a coordinate transformation on the first ROI image and on the second ROI image respectively.

13. The three dimensional sensing device according to claim 12, wherein the image processing unit scales a coordinate of a point according to a scaling factor of the resolution scaling.

14. The three dimensional sensing device according to claim 13, wherein the coordinate of the point of the first ROI image or of the second ROI image is (x',y'), and a formula for the coordinate transformation comprises:

$x=\alpha x'$, $\alpha=M/m$; and $y=\beta y'$, $\beta=N/n$;

wherein (x,y) is a coordinate of a point corresponding to the first pending image or the second pending image, $\alpha$ is a horizontal scaling factor of the resolution scaling, and $\beta$ is a vertical scaling factor of the resolution scaling.

15. The three dimensional sensing device according to claim 13, wherein the coordinate of the point of the first ROI image or of the second ROI image is (x'',y''), and a formula for the coordinate transformation comprises:

$x=x''+\tau_x$; and $y=y'+\tau_y$;

wherein (x,y) is a coordinate of a point corresponding to the first pending image or the second pending image, and $(\tau_x, \tau_y)$ is the translation vector between an origin of the first ROI image or of the second ROI image and an origin of the first pending image or of the second pending image, respectively.

16. The three dimensional sensing device according to claim 12, wherein
the image processing unit further generates the first corrected image and the second corrected image by performing a composite transformation function on the first ROI image and the second ROI image, wherein the anti-distortion correction and the image rectification are combined into the composite transformation function.

17. The three dimensional sensing device according to claim 9, wherein the projection pattern projected by the projecting device is pre-designed or generated at random.

18. The three dimensional sensing device according to claim 9, wherein the projection pattern projected by the projecting device is a scattered dot pattern distributed at random.

19. A three dimensional sensing device, comprising:
- a projecting device, for projecting a projection pattern to an object, wherein the projecting device serves as a virtual image acquiring device, and an inherent image of the projection pattern serves as a virtual first pending image which resolution is M×N;
- an image acquiring device, for sensing the projection pattern projected on the object to generate a real second pending image which resolution is M×N;
- an image processing unit, coupled to the projecting device and the first image acquiring device, for generating a first scaled image and a second scaled image which resolutions are m×n by performing a resolution scaling on the first pending image and the second pending image respectively, where m<M, n<N, and M, N, m, n are positive integers,
- wherein the image processing unit performs a full-scene three dimensional measurement on the first scaled image and the second scaled image to obtain a full-scene depth image and analyzes the full-scene depth image to set a first region of interest (ROI) in the image acquiring device and a second ROI in the image acquiring device, and the image processing unit restores a resolution of the first ROI and the second ROI of the full-scene depth image according to a scaling factor of the resolution scaling, so as to obtain a first ROI image and a second ROI image and performs a partial-scene three dimensional measurement on the first ROI image and the second ROI image, thereby a partial-scene depth image is obtained accordingly.

* * * * *